2,861,910

POLYESTERS AND LAMINATES THEREFROM

Christian W. Johnston, Severna Park, and Robert A. Meara, Baltimore, Md., assignors to National Distillers and Chemical Corporation, a corporation of Virginia No Drawing. Application August 31, 1954
Serial No. 453,434

7 Claims. (Cl. 154—43)

This invention relates broadly to polyesters and to the resinous compositions prepared therefrom, and more particularly to unsaturated polyesters and to laminated structures made from them in conjunction with glass materials and the like.

Previous studies have shown that the properties of organic polyesters and their use in commercial applications, for instance, to prepare resins which are used in the production of fiber glass products such as laminates, are very dependent on the molecular structures of the particular glycol and acid components. In the past, the only readily available glycols have been those prepared from olefins having relatively low molecular weights and in which the hydroxyl groups are on adjacent carbon atoms, or possibly those in which the carbons having the hydroxyl groups are separated by only one of two carbon atoms. However, higher molecular weight glycols, having the hydroxyl groups separated by more than one carbon atom, have been difficult to obtain and expensive to manufacture on a commercial scale, since they were generally made by reduction of esters of higher molecular weight dibasic acids.

Thus, the range of high molecular weight glycols readily available for preparing polyesters has been limited to a marked degree.

The polyesters derived from certain new glycols obtained by recently discovered methods have been prepared and these, together with certain derivatives and laminates prepared therefrom, constitute the novel compositions of this invention.

The polyesters used in this invention are formed by reaction of a carboxylic acid, preferably a dibasic acid or its anhydride with the saturated branched chain glycols of at least ten carbon atoms. The terminal hydroxyl groups are separated by at least six, and preferably eight, carbon atoms and there is preferably at least one branch on said chain containing two carbon atoms.

The present invention is concerned with the preparation of polyester resins and laminates from the following new saturated $C_{10}$, $C_{12}$, and $C_{14}$ glycols, their mixtures and mixtures containing them: 2-ethyl-1,8-octanediol, 3-ethyl-1,10-decanediol, 3,6-diethyl-1,8-octanediol, 4,7-diethyl-2,9-decanediol, 4-ethyl-2,11-dodecanediol, and 3,13-tetradecanediol and particularly with unsaturated curable resins and plastics therefrom.

As acids there may be used substantially any aliphatic diacid including succinic acid, adipic acid, methyl adipic acid, fumaric acid, maleic acid, malic acid, dihydromuconic acid, azelaic acid, sebacic acid, suberic acid, maleic anhydride, and also phthalic, terephthalic and isophthlic acids, phthalic anhydride, and higher dicarboxylic acids. For preparation of cured resins and laminates, it is necessary to employ an unsaturated diacid or anhydride with or without styrene. Maleic anhydride is especially preferred. Monobasic acids can also be included to modify the polyesters.

Mixtures of various of the glycols and diacids can also be used, the products obtained being mixed polyesters.

Polyester resins generally consist of a high molecular weight ester made from a diol and a dicarboxylic unsaturated acid compound (acid or anhydride) such as maleic anhydride plus a second dicarboxylic acid of a saturated nature used to dilute the high activity of the maleic anhydride and bring the exothermic reaction resulting during polymerization under the desired degree of control. This polyester is usually of extremely high viscosity or is a semi-solid and for trade purposes it is dissolved in styrene which serves as a solvent as well as a reactant. Generally, the styrene content is high (50% or more by weight). This mixture is polymerized by a peroxide type of catalyst. The actual growing styrene chains copolymerize with the unsaturated portion of the polyester and thus the polyester introduces cross links and produces a characteristic thermosetting resin.

These resins in combination with glass fibers and other siliceous materials are capable of being molded into a variety of structures having high strength. The resin-glass fiber combinations have a wide variety of applications including molded tubing, flat and corrugated roofing material, boat hulls, tanks, electrical "potting" compounds, boxes and trays, television and radio cabinets and other home appliances, bathtubs, piping and shaped parts for automobiles, aircraft and the like. These glass reinforced plastics have a number of outstanding advantages such as high strength-weight ratio, good electrical and thermal properties, ease and economy in molding, and high resistance to water, corrosive chemicals and organic solvents.

In many applications, for instance, in lay-up work, it is quite desirable to employ a resin having a relatively high viscosity. This insures proper tack, film thickness, and minimum flow. High viscosity resins, however, show such disadvantages as slow penetration and are difficult to disperse and are slow to dissolve catalysts and fillers. The unsaturated resins prepared from the new glycols show the unusual properties of relatively lower viscosity and therefore require less styrene to make useful resin solutions. They give more rapid penetration and are particularly valuable in impregnation work such as insulating electrical coils and also for uses where run-off is not critical.

Polyester resins made from the $C_{12}$ glycols and maleic anhydride, for example, produce laminated fiber glass products of very high strength and tensile modulus. Furthermore, these products are more flexible.

The unsaturated polyesters made with $C_{12}$ glycols reduce the functionality of the maleic anhydride to a satisfactory degree without requiring any other non-functional dicarboxylic acid to dilute the maleic reactivity.

Since the polyester formed is of much lower viscosity than other polyesters, less styrene is used. This low viscosity resin also has other uses, e. g. polymerization without styrene and/or cross linking with sulfur, or for making flexible resins using materials other than fiber glass as fillers.

The degree and state of polymerization of the polyesters themselves may be conveniently determined by analysis for the average number of carboxyl and hydroxyl groups in a given amount of the polyester. The acid number is a measure of the number of terminal carboxyl groups, and the hydroxyl number is a measure of the number of terminal hydroxyl groups. The sum of the carboxyl and hydroxyl numbers is an indication of the average number of terminal groups present in the polyester product which, in turn, is an indication of the degree of polymerization.

The branched chain, high molecular weight glycols which are chiefly used as components in the novel compositions and processes of this invention are readily made by initially treating an aliphatic conjugated diolefin with finely dispersed sodium or potassium in a selected liquid ether medium and in the presence of a relatively small amount of polycyclic aromatic hydrocarbon and/or in the presence of a selected solid, friable attrition agent at controlled temperatures. This initial step is a reaction which yields a dimerized product of the starting diolefin. For example, if butadiene and sodium are used, the dimeric product comprises the disodium derivatives of the aliphatic octadienes. This product is then converted to a glycol product or a mixture of glycol products. This may be done by treatment with either a carbonyl compound such as an aldehyde or ketone or an epoxide under selective conditions to yield ultimately glycol products which are subsequently hydrogenated to give saturated glycols. Generally, mixtures of isomeric glycol products are obtained. Other methods may also be used for obtaining the glycols and mixtures of glycols.

For example, using the dimer derivative of butadiene with formaldehyde, a mixture of $C_{10}$ glycols is obtained including 2-ethyl-1,8-octanediol. Butadiene dimer and acetaldehyde ultimately yield an isomeric mixture of $C_{12}$ glycols and substitution of acetone or propionaldehyde for acetaldehyde gives $C_{14}$ glycols. The dimerized derivatives of butadiene with ethylene oxide also yield an isomeric $C_{12}$ glycol mixture including 3,6-diethyl-1,8-octanediol and 3-ethyl-1,10-decanediol. Use of propylene oxide and butadiene dimer gives $C_{14}$ glycols including 4,7-diethyl-2,9-decanediol, 4-ethyl-2,11-dodecanediol, and 2,13-tetradecanediol. Other reactants yield higher molecular weight isomeric glycol mixtures accordingly.

Since unsaturated polyesters are not generally very stable during storage, and the tendencies to gel and cross-link are stronger after they are dissolved in styrene, it is the usual practice to add to the polyester-ester mixture from 0.01% to 0.001% of an inhibitor such as p-tert.-butyl catechol, hydroquinone, p-nitrosodimethylaniline and similar compounds.

The polymerization of unsaturated polyester-styrene mixtures to fully cured solids requires the use of a catalyst. For such polymerizations, free-radical initiators such as peroxides and azo compounds are good catalysts. Many compounds of the peroxide type are available. Choice of any particular peroxide depends upon several factors. The acyl peroxides such as benzoyl peroxide can be used, as well as aldehydes or ketone peroxides, for instance, methyl ethyl ketone peroxide or cyclohexanone peroxide. Cumene hydroperoxide is also useful as a catalyst.

It has been found most convenient to disperse the peroxide catalyst into inert liquids such as dimethyl phthalate or tricresyl phosphate before addition to the unsaturated esters. The amount of catalyst that will give satisfactorily cured resin having optimum characteristics depends on many factors, including the particular type of resin, desired speed of cure, and size of the pieces being fabricated. In general, from 0.1 to 2.0% peroxide is sufficient. Somewhat higher concentrations are usually required for thin laminates.

It is further known to employ suitable promoters and activators for the polymerization. These materials may be employed to alter the so-called induction period, which is the time required for gelation, and the cure time, which is the time required for the resin to become fully cured. Cobalt naphthenate is a typical useful activator. Certain amines also show promise.

The reinforced plastics, and more specifically, the laminated plastics or resins, are mixtures of the plastic material with reinforcing materials. Reinforcing materials are usually of a fiber type such as glass, asbestos, cotton, rayon, nylon, Orlon, Dacron, paper and the like, with glass reinforced thermosetting resins having the greatest importance. Glass fibers may be used in various forms, such as woven fabric or cloth, yarn, strands, roving, mats, preforms and the like. If desired, the glass materials can be treated with selected finishes to improve the wettability of the fibers by the resin and/or to improve the strength of the cured composition.

A wide variety of inert fillers including calcium carbonate, barium sulfate, talc, kaolin, asbestos, silica, diatomaceous earth, and the like can likewise be added in the compositions in order to impart opacity, reduce mold shrinkage, decrease crazing, reduce water absorption, increase viscosity, give better surface finishes, and for other improvements in properties. The use of silica in such compositions produces a material useful for "potting" electrical components. Fillers also make the compositions less costly. It is also quite feasible to add varying amounts of pigments to impart color and opacity to the finished compositions.

The laminate structures are built up by a "lay-up" technique and these can be cured at either room temperature or by the application of heat, as in an oven cure. The glass material can either be impregnated with the appropriate resin mixture using a dip tank and squeezing out the excess, or the glass can be laid down in layers and each layer suitably coated with the resin mixture.

The invention will be more completely described in detail by the following examples although it is not intended to limit the invention specifically thereto. All parts are by weight unless otherwise indicated.

EXAMPLE 1

Disodiooctadiene was prepared from three moles of butadiene and three gram atomic weights of sodium in dimethyl ether reaction medium. The reaction was carried out by initially preparing finely divided sodium dispersion in isooctane and contacting the dispersion in the presence of the dimethyl ether reaction medium with butadiene in the presence of about 1 to 2% of terphenyl. A temperature of about —23° C. was used. The approximate yield of disodiooctadiene from this reaction was about 1.2 moles. When this initial reaction was complete, 3.0 moles of gaseous ethylene oxide were admitted to the mixture over a two-hour period while maintaining a reaction temperature of about —23° C. by refluxing the dimethyl ether. The disodium salts of the resulting $C_{12}$ glycols were treated with methanol and then with water to destroy any unreacted sodium and to liberate the unsaturated glycols from the corresponding sodium alkoxides. The layers were separated and the inert solvents removed from the organic layer. The residual oil was dissolved in ethanol and hydrogenated over a platinum oxide catalyst. Removal of the ethanol and catalyst, and distillation at reduced pressure gave about 65% yield of a viscous oil of saturated $C_{12}$ glycols. These glycols were shown to include substantial quantities of 3,6-diethyl-1,8-octanediol, 3-ethyl-1,10-decanediol, and some 1,12-dodecanediol.

The $C_{10}$ glycols and those glycols higher than $C_{12}$ are prepared by analogous procedures employing formaldehyde or a higher carbonyl compound in place of the ethylene oxide used in the above description.

A mole for mole ratio was used for the anhydride and the $C_{12}$ glycols prepared as described above in order to build a high molecular weight polyester. A mixture of xylenes was used as the entraining agent. The mixed $C_{12}$ diols contained substantial quantities of 3-ethyl-1,10-decanediol and 3,6-diethyl-1,8-octanediol. The reactor was charged with the following mixture:

110.0 g. mixed $C_{12}$ glycols
52.5 g. maleic anhydride
141.0 g. mixed xylenes

As the reaction proceeded, the acid value was reduced from a theoretical of 99 to 69 in 2 hours at pot temperature of 148° C.

The acid value was further reduced to 40 in another 6 hours with the pot temperature rising to 165° C. as the xylene was removed. By the time all the xylene was removed, the acid value was 19.1.

When the first batch of this material was blended 50 to 50 with styrene, the viscosity was reduced to 1.0 poise. This product is too thin to use for lay-up purposes. In order to reduce the acid value as low as possible with a resultant increase of molecular weight and viscosity of the polyester, some additional glycol was added (15.9 g. of propylene glycol). After 9 hours at pot temperature of 200° C., with gentle nitrogen purge and steam jacketed column to remove water but retain the glycol, the acid value was reduced to 4.7. After removal of excess glycol, the final acid value was 0.67.

Preparation of laminate

The polyester remaining after reducing the acid value to 0.67 was cut with 25% by weight of styrene; the viscosity was reduced to 5.5 poises. Further diluting of the polyester gave too great a reduction in viscosity, for instance, 1.65 poises at 40% styrene. Thus, this polyester could be formulated with less styrene to give the desired viscosity.

The polyester-styrene mixture used for the laminate studies contained:

58.7 g. polyester
21.2 g. styrene
0.8 g. benzoyl peroxide in TCP (50/50 mixture)
1.3 g. cobalt naphthenate solution (6% Co in xylene)

This mixture was spread on the glass cloth and the laminate built up with successive layers until there were 6 plys. Bubbles were worked out of the lay-up and the whole sealed in cellophane.

The lay-up was placed into the heated press at an average temperature of 92° C. The temperature was raised and maintained at an approximate average of 132° C. and pressure of 1000 p. s. i. for an hour. After an hour, the laminate was found to be quite flexible. It was returned to the press under the same conditions for an additional 3 hours during which time it became slightly harder and stiffer. The pressing cycle can be modified by varying the amount of catalyst and/or promoter used.

The finished laminate was calculated to contain 26.5% resin and 73.5% glass cloth.

Testing

Tensile specimens were prepared by cutting the laminate and carefully removing chipped and frayed edges with fine emery cloth. The specimens were then carefully measured with a micrometer.

Out of three specimens of approximately the same dimensions, only one failed under full load of the Scott IP-4 tensile tester.

The results must, therefore, be reported as greater than 14,000 p. s. i. for the tensile strength. The ultimate elongation was 6% and the ultimate modulus was 230,000 p. s. i.

The breaking load on the tensile tester was 44 pounds. The specimen was 0.052″ thick and 0.061″ wide. Length between the jaws was 1.00″.

An attempt was made to determine the tensile properties of the resin alone, that is, the resin material free from glass fibers and cracks. A test on a specimen after 1 hour cure resulted in the following figures:

Tensile strength _____ p. s. i__ 465
Ultimate elongation _____ percent__ 15
Ultimate modulus _____ p. s. i__ 3,100

The specimen measured 0.045″ thick, 0.160″ width, 1.00″ length between jaws. Breaking load was 3.35 pounds.

After the additional 3 hour cure, material allowing 0.5″ length between jaws was used. This specimen, measuring 0.050″ thick and 0.105″ wide, gave the following results:

Tensile strength _____ p. s. i__ 600
Ultimate elongation _____ percent__ 18
Ultimate modulus _____ p. s. i__ 3300
Breaking load _____ lbs__ 3.15

These figures are presented to show the magnitude of the properties of the cured resin.

EXAMPLE 2

A charge of an equal number of moles of the $C_{12}$ glycols and maleic anhydride is placed in a reactor with a solvent suitable as an entrainer to remove water of esterification. Generally, hydrocarbons of an aromatic nature are used although chlorinated or aliphatic solvent may also be used.

The reactor is heated in the neighborhood of 165–220° C. and the amount of entraining solvent such as xylene, toluene, or high flash naphtha is adjusted, by making suitable additions or withdrawals, until active refluxing is obtained at the desired temperature. The solvent is condensed in a reflux condenser and passed to a solvent well such that the water separated out. If low density solvents are used, the water settles to the bottom of the well and solvent overflows back to the reactor. With chlorinated solvents, the water is accumulated on the top and the solvent returned to the kettle from the lower layer.

A typical charge is as follows where the xylene is that charged to the kettle and is in addition to that originally used to fill the solvent well.

Component: Parts by weight
$C_{12}$ mixed branched chain glycols_____ 200
Maleic anhydride _____ 100
Xylene _____ 30

This charge is reacted until the acid value is brought down to between 4 and 12. This may require between 4 to 16 hours reaction time, depending upon the temperature chosen and the efficiency of the agitation, solvent refluxing, and water separation. A catalyst for esterification may be used to further reduce this reaction time, but this is not essential.

After the reaction is complete, the solvent may or may not be removed, depending upon the viscosity desired for the final product. In general, the solvents are removed except in the case of aromatic solvents.

The final resin is next mixed with styrene after having been cooled down to about 60° C. or lower if the viscosity permits. Generally, resins used for polyester laminates are thinned with an equal weight (based on solids) of styrene, to obtain resins whose viscosities are within the workable range (5–70 poises). If such resins are to be stored for a considerable period, inhibitors may be employed in the range of 0.05 to 0.20%, based on the total styrene and resin.

Using the $C_{12}$ glycols, the resultant resins are lower in viscosity than those generally obtained. For example, a solution of resin (solvent free) in styrene containing 40% resin by weight had a viscosity of 1.6 poises and one containing 75% resin had a viscosity of 5.5 poises. It is thus possible to make useful resin solution of a viscosity suitable for hand "lay-ups" using less styrene. These combinations, because of their reduced styrene content, are useful where control of the resin contraction during curing is required. Furthermore, these resins are more flexible and yet retain their strength.

EXAMPLE 3

If greater strength is required, without substantial loss in flexibility, the styrene content may be increased to 50%. This produces a mixture of low viscosity and will be useful for application where thin coatings are required, e. g. surface coating of metal or wood, holding glass mats in a fixed shape such as in preforms currently used in the polyester resin business, or other applications where it is desired to keep the resin content low, so that greater penetration can be obtained such as is required when impregnating coils or other electrical equipment. This low viscosity resin can be used as a solvent for polystyrene or other polymerized hydrocarbon type resins. This product cures with a very minimum of mold shrinkage and still produces strong articles, characteristic of high styrene polyester mixtures. A typical use for such a material would be for "potting" electrical components. Also, the low viscosity resin mixture (50% styrene) can be thickened with such additives as aluminum stearate or other metallic soaps and used in the conventional manner to produce resins of increased flexibility. Such resins, particularly when protected by the addition of an ultra violet light screen make excellent corrugated, transparent, light screens, since shattering around nail holes is greatly reduced.

EXAMPLE 4

If a more reactive resin is desired, part of the $C_{12}$ glycols can be replaced with a glycol of less molecular size and thus the active maleic anhydride content is increased. This modified material will have more reactivity, higher exothermic heat, and, in general, will cure faster. The greater exothermic heat permits the use of this resin for thinner sections or forms from which the heat can be easily removed. Half or less than half of the $C_{12}$ molecules can be replaced by a lower molecular weight glycol such as propylene glycol or ethylene glycol. Typical polyester formulae for this type of resin is as follows:

| Component | I<br>Parts by Weight | II<br>Parts by Weight |
| --- | --- | --- |
| $C_{12}$ Glycol | 51.5 | 101 |
| Ethylene Glycol | 15.5 | |
| Propylene Glycol | | 38 |
| Maleic Anhydride | 98 | 98 |
| Entraining Solvent (xylenes) | 27 | 24 |

These resins are prepared and reacted as described in Example 1. Similarly, these resins can also be made using fumaric acid in place of maleic anhydride. When resins which will polymerize slower and with less exothermic heat are required, the functionality can be reduced by using other acids or diacids. Various useful combinations of acid and glycols and/or glycerol are shown in the following tabulation:

| Component | A | B | C | D | E | F |
| --- | --- | --- | --- | --- | --- | --- |
| | Parts by Weight | | | | | |
| $C_{12}$ Glycols | 202 | 202 | 101 | 101 | 101 | 101 |
| Ethylene Glycol | | | 31 | | | 16 |
| Glycerol | | | | 46 | 46 | 23 |
| Maleic Anhydride | 49 | | 49 | 49 | | 25 |
| Fumaric Acid | | 58 | | | 58 | 29 |
| Benzoic Acid | | | | 61 | 61 | 31 |
| Phthalic Anhydride | 74 | 74 | 74 | | | 74 |
| Xylenes | 33 | 33 | 26 | 26 | 27 | 28 |

What is claimed is:
1. A composition comprising (A) a polyester product prepared by reacting an unsaturated acid compound selected from the group consisting of ethylenically unsaturated aliphatic organic dicarboxylic acids and anhydrides thereof, with a mixture of saturated branched chain aliphatic glycols having a total of at least ten carbon atoms per molecule, with only carbon atoms in the skeletal chain, at least one $C_2$ branch per molecule, and in which the terminal hydroxyl groups are separated by at least six carbon atoms, and (B) styrene.
2. The composition of claim 1 wherein said compound is maleic anhydride.
3. The composition of claim 1 wherein said glycol mixture is a mixture of saturated $C_{12}$ glycols comprising 3-ethyl-1,10-decanediol and 3,6-diethyl-1,8-octanediol.
4. A product obtained by copolymerizing (A) a polyester product prepared by reacting an unsaturated acid compound selected from the group consisting of ethylenically unsaturated, aliphatic, organic dicarboxylic acids and anhydrides thereof, with a mixture of saturated branched chain aliphatic glycols having a total of at least ten carbon atoms per molecule, with only carbon atoms in the skeletal chain, at least one $C_2$ branch per molecule and in which the terminal hydroxyl groups are separated by at least six carbon atoms with (B) styrene.
5. A laminated article comprising a plurality of sheets of glass fiber material and as a binder therefore the product of claim 4.
6. The product of claim 4 wherein said acid compound is maleic anhydride.
7. A laminated article comprising a plurality of sheets of glass fiber material and as a binder therefore the product of claim 6.

References Cited in the file of this patent

UNITED STATES PATENTS

| | | |
| --- | --- | --- |
| 2,443,741 | Kropa | June 22, 1948 |
| 2,585,827 | Padbury et al. | Feb. 12, 1952 |
| 2,599,468 | McKeever | June 3, 1952 |
| 2,757,210 | Jenner | July 31, 1956 |

FOREIGN PATENTS

| | | |
| --- | --- | --- |
| 644,287 | Great Britain | Oct. 11, 1950 |
| 685,449 | Great Britain | Jan. 7, 1953 |